US012578583B2

(12) United States Patent
Choi et al.

(10) Patent No.: US 12,578,583 B2
(45) Date of Patent: Mar. 17, 2026

(54) APPARATUS AND METHOD OF MANUFACTURING DISPLAY DEVICE

(71) Applicant: Samsung Display Co., LTD., Yongin-si (KR)

(72) Inventors: Kyongsik Choi, Yongin-si (KR); Jaewoong Moon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 293 days.

(21) Appl. No.: 18/241,851

(22) Filed: Sep. 2, 2023

(65) Prior Publication Data

US 2024/0168303 A1     May 23, 2024

(30) Foreign Application Priority Data

Nov. 17, 2022     (KR) ......................... 10-2022-0154694

(51) Int. Cl.
G02B 27/09          (2006.01)
G02B 3/00           (2006.01)
G02B 27/28          (2006.01)

(52) U.S. Cl.
CPC ....... G02B 27/0916 (2013.01); G02B 3/0062 (2013.01); G02B 27/0955 (2013.01); G02B 27/28 (2013.01); *G02B 2003/0093* (2013.01)

(58) Field of Classification Search
CPC .................................................. G02B 3/0062
See application file for complete search history.

(56) References Cited

U.S. PATENT DOCUMENTS

| 7,839,573 B2 | 11/2010 | Wippermann et al. |
| 8,937,770 B2 | 1/2015 | Simon et al. |
| 2015/0185152 A1* | 7/2015 | Maher ................ G01N 21/6452 |
| | | 506/39 |

FOREIGN PATENT DOCUMENTS

| KR | 1020030078742 A | 10/2003 |
| KR | 1020060034043 A | 4/2006 |
| KR | 100840832 B1 | 6/2008 |
| KR | 1020210103627 A | 8/2021 |

* cited by examiner

*Primary Examiner* — Edmond C Lau
(74) *Attorney, Agent, or Firm* — CANTOR COLBURN LLP

(57) ABSTRACT

An apparatus for manufacturing a display device includes a laser emission unit including a first laser unit emitting a first laser beam and a second laser unit emitting a second laser beam, and a homogenizer which homogenizes the first laser beam and the second laser beam. The homogenizer includes a homogenizing lens unit including a plurality of homogenizing lenses which separate each of the first laser beam and the second laser beam into a plurality of laser beams and generate overlapping laser beams by overlapping the plurality of laser beams obtained by separating each of the first laser beam and the second laser beam with each other, and a condenser lens unit which condenses the overlapping laser beams, the plurality of homogenizing lenses being arranged in a curved shape.

10 Claims, 20 Drawing Sheets

APPARATUS AND METHOD OF MANUFACTURING DISPLAY DEVICE

This application claims priority to Korean Patent Application No. 10-2022-0154694, filed on Nov. 17, 2022, and all the benefits accruing therefrom under 35 U.S.C. § 119, the content of which in its entirety is herein incorporated by reference.

BACKGROUND

1. Field

Embodiments relate to an apparatus and method, and more particularly, to an apparatus and method of manufacturing a display device.

2. Description of the Related Art

Electronic devices based on mobility are being widely used. As mobile electronic devices, in addition to small electronic devices, such as mobile phones, tablet personal computers are being widely used in recent years.

Such mobile electronic device includes a display device that supports various functions and provides visual information, such as an image or a video, to a user. Recently, as a size of other components for driving a display device is being reduced, a proportion of the display device in an electronic device is being gradually increased, and a structure that may be bent to have a predetermined angle from a flat state is being developed.

SUMMARY

Embodiments include a method of separating and overlapping laser beams by arranging a plurality of homogenizing lenses in a curved shape to allow energy density distribution of the laser beams becomes uniform.

However, these features are illustrative, and the scope of the disclosure is not limited thereto.

Additional features will be set forth in part in the description which follows and, in part, will be apparent from the description, or may be learned by practice of the presented embodiments of the disclosure.

In an embodiment of the disclosure, an apparatus for manufacturing a display device includes a laser emission unit including a first laser unit emitting a first laser beam and a second laser unit emitting a second laser beam, and a homogenizer which homogenizes the first laser beam and the second laser beam. The homogenizer includes a homogenizing lens unit including a plurality of homogenizing lenses which separate each of the first laser beam and the second laser beam into a plurality of laser beams and generate overlapping laser beams by overlapping the plurality of laser beams obtained by separating each of the first laser beam and the second laser beam with each other, and a condenser lens unit which condenses the overlapping laser beams, the plurality of homogenizing lenses is arranged in a curved shape.

In an embodiment, the homogenizing lens unit may further include a first homogenizing lens unit including a plurality of first homogenizing lenses, and a second homogenizing lens unit including a plurality of second homogenizing lenses. Each of the first laser beam and the second laser beam may sequentially pass through the first homogenizing lens unit and the second homogenizing lens unit.

In an embodiment, the first homogenizing lens unit may include a first-1 homogenizing lens unit into which the first laser beam is incident and including a plurality of first-1 homogenizing lenses and a first-2 homogenizing lens unit into which the second laser beam is incident, including a plurality of first-2 homogenizing lenses, and arranged side by side with the first-1 homogenizing lens unit, and the first laser beam and the second laser beam may overlap with each other while the first laser beam passes through the first-1 homogenizing lens unit and the second laser beam passes through the first-2 homogenizing lens unit.

In an embodiment, the second homogenizing lens unit may include a second-1 homogenizing lens unit including a plurality of second-1 homogenizing lenses, and a second-2 homogenizing lens unit including a plurality of second-2 homogenizing lenses and arranged side by side with the second-1 homogenizing lens unit.

In an embodiment, the homogenizing lens unit may further include a third homogenizing lens unit including a plurality of third homogenizing lenses, and the third homogenizing lens unit may be linearly movable between the first homogenizing lens unit and the second homogenizing lens unit.

In an embodiment, at least two of the plurality of homogenizing lenses may have different shapes.

In an embodiment, at least one of the plurality of homogenizing lenses may have a refractive index that gradually changes.

In an embodiment, at least one of the plurality of homogenizing lenses may have polarization characteristics.

In an embodiment, the homogenizing lens unit may further include an auxiliary lens connected to the plurality of homogenizing lenses.

In an embodiment, the auxiliary lens may include at least one of a convex lens and a concave lens.

In an embodiment of the disclosure, a method of manufacturing a display device includes emitting a first laser beam, emitting a second laser beam, passing the first laser beam and the second laser beam through a homogenizing lens unit including a plurality of homogenizing lenses which are arranged in a curved shape, separate each of the first laser beam and the second laser beam into a plurality of laser beams and generate overlapping laser beams by overlapping the plurality of laser beams with each other, and condensing the overlapping laser beams.

In an embodiment, the method may further include sequentially passing each of the first laser beam and the second laser beam through the first homogenizing lens unit and the second homogenizing lens unit.

In an embodiment, the method may further include passing the first laser beam through a first-1 homogenizing lens unit, passing the second laser beam through a first-2 homogenizing lens unit, and overlapping the first laser beam passing through the first-1 homogenizing lens unit and the second laser beam passing through the first-2 homogenizing lens unit with each other.

In an embodiment, the method may further include simultaneously passing each of the first laser beam and the second laser beam, which have passed through the first homogenizing lens unit, through a second-1 homogenizing lens unit and a second-2 homogenizing lens unit arranged side by side with the second-1 homogenizing lens unit.

In an embodiment, the method may further include arranging a third homogenizing lens unit between the first homogenizing lens unit and the second homogenizing lens unit, and linearly moving the third homogenizing lens unit between the first homogenizing lens unit and the second homogenizing lens unit.

In an embodiment, at least two of the plurality of homogenizing lenses may have different shapes.

In an embodiment, at least one of the plurality of homogenizing lenses may have a refractive index that gradually changes.

In an embodiment, at least one of the plurality of homogenizing lenses may have polarization characteristics.

In an embodiment, the homogenizing lens unit may further include an auxiliary lens connected to the plurality of homogenizing lenses.

In an embodiment, the auxiliary lens may include at least one of a convex lens and a concave lens.

Other features and advantages other than those described above will now become apparent from the following drawings, claims, and the detailed description of the disclosure.

BRIEF DESCRIPTION OF THE DRAWINGS

The above and other features and advantages of illustrative embodiments of the disclosure will be more apparent from the following description taken in conjunction with the accompanying drawings, in which:

FIG. 2 is a schematic side view of an embodiment of a portion of an apparatus for manufacturing a display device;

FIG. 3 is a schematic side view of another embodiment of a portion of an apparatus for manufacturing a display device;

FIG. 4 is a schematic side view of another embodiment of a portion of an apparatus for manufacturing a display device;

FIG. 5 is a schematic side view of another embodiment of a portion of an apparatus for manufacturing a display device;

DETAILED DESCRIPTION

Figure 1:
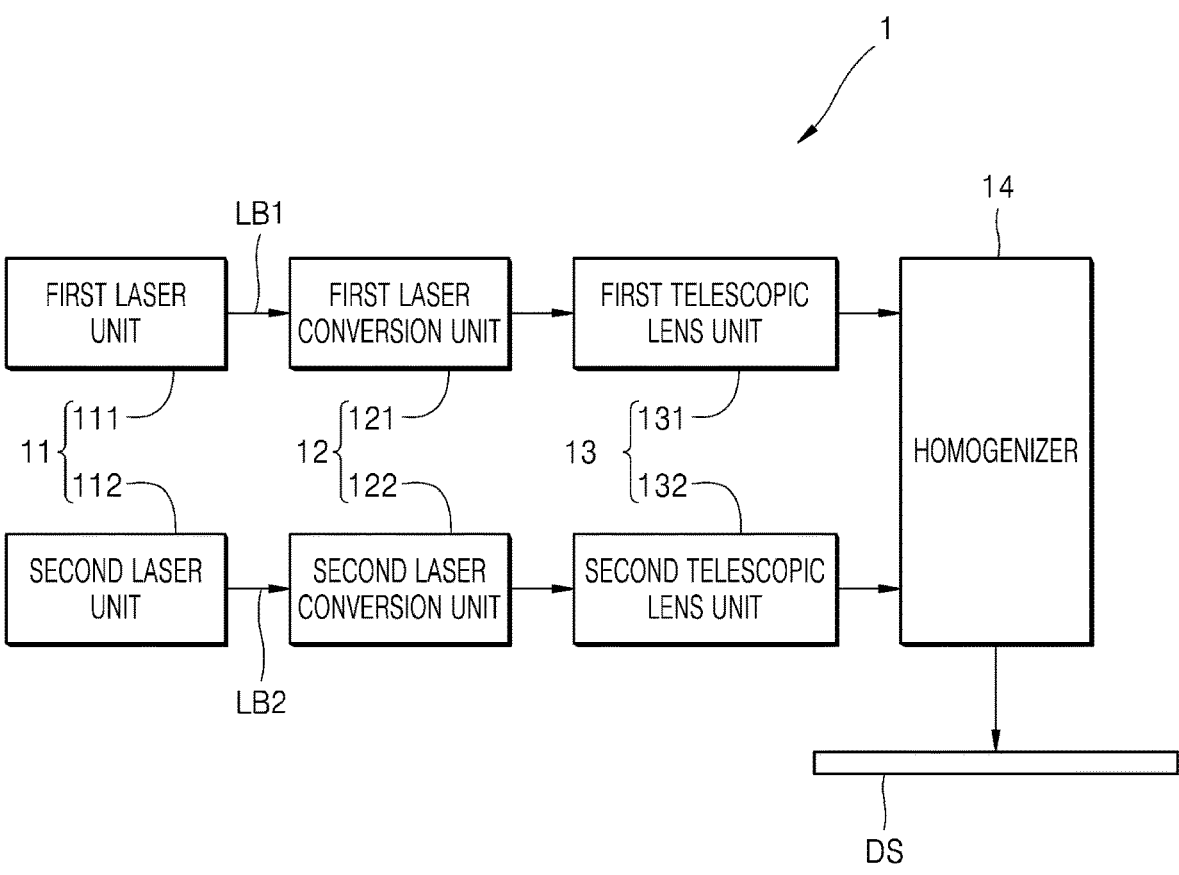
FIG. 1 is a schematic block diagram of an embodiment of an apparatus for manufacturing a display device.

Reference will now be made in detail to embodiments, illustrative embodiments of which are illustrated in the accompanying drawings, where like reference numerals refer to like elements throughout. In this regard, the illustrated embodiments may have different forms and should not be construed as being limited to the descriptions set forth herein. Accordingly, the embodiments are merely described below, by referring to the drawing figures, to explain features of the description. As used herein, the term "and/or"

includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Effects and features of the disclosure and methods of achieving the same will be apparent with reference to embodiments and drawings described below in detail. The disclosure may, however, be embodied in many different forms and should not be construed as being limited to the embodiments set forth herein.

The disclosure will now be described more fully with reference to the accompanying drawings, in which embodiments of the disclosure are shown. Like reference numerals in the drawings denote like elements, and thus their description will be omitted.

In the following embodiments, while such terms as "first," "second," etc., may be used to describe various elements, such elements must not be limited to the above terms.

In the following embodiments, an expression used in the singular encompasses the expression of the plural, unless it has a clearly different meaning in the context.

In the following embodiments, it is to be understood that the terms such as "including" and "having" are intended to indicate the existence of the features, or elements disclosed in the disclosure, and are not intended to preclude the possibility that one or more other features or elements may exist or may be added.

It will be understood that when a layer, region, or component is referred to as being formed on another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the disclosure is not limited thereto.

The x, y, and z axes are not limited to three axes on the orthogonal coordinates system, and may be interpreted in a broad sense including the same. In an embodiment, the x-axis, the y-axis, and the z-axis may be perpendicular to one another, or may represent different directions that are not perpendicular to one another.

When an illustrative embodiment may be implemented differently, a predetermined process order may be performed differently from the described order. In an embodiment, two consecutively described processes may be performed substantially at the same time or performed in an order opposite to the described order.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic block diagram of an embodiment of an apparatus 1 for manufacturing a display device.

Referring to FIG. 1, the apparatus 1 for manufacturing a display device may include a laser emission unit 11, a laser conversion unit 12, a telescopic lens unit 13, and a homogenizer 14.

The laser emission unit 11 may emit intense light, e.g., laser beams. In an embodiment, a laser beam emitted by the laser emission unit 11 may be an excimer laser beam. The laser emission unit 11 may include a first laser unit 111 that emits a first laser beam LB1 and a second laser unit 112 that emits a second laser beam LB2. A laser beam emitted by the laser emission unit 11 may be incident to the laser conversion unit 12.

The laser conversion unit 12 may convert optical characteristics of the laser beam. In an embodiment, the laser conversion unit 12 may convert characteristics, such as dispersion and polarization or the like, of the laser beam, for example. The laser conversion unit 12 may include a first laser conversion unit 121 and a second laser conversion unit 122. The first laser conversion unit 121 may convert optical characteristics of the first laser beam LB1 emitted by the first laser unit 111. The second laser conversion unit 122 may convert optical characteristics of the second laser beam LB2 emitted by the second laser unit 112. The laser beam passing through the laser conversion unit 12 may be incident to the telescopic lens unit 13.

The telescopic lens unit 13 may adjust the cross-sectional size of a laser beam. Herein, a cross-section of a laser beam refers to a cross-section of the laser beam that is perpendicular to a traveling direction of the laser beam. The telescopic lens unit 13 may adjust at least one of a length in a major axis direction and a length in a minor axis direction D2 of a laser beam. The telescopic lens unit 13 may include a first telescopic lens unit 131 and a second telescopic lens unit 132. The first telescopic lens unit 131 may adjust the cross-sectional size of the laser beam passing through the first laser conversion unit 121. The second telescopic lens unit 132 may adjust the cross-sectional size of the laser beam passing through the second laser conversion unit 122. The laser beam passing through the telescopic lens unit 13 may be incident to a homogenizer 14.

The homogenizer 14 may homogenize the first laser beam LB1 and the second laser beam LB2. The homogenizer 14 may separate each of the first laser beam LB1 and the second laser beam LB2 into a plurality of laser beams such that an intensity distribution of the laser beams may be uniform. A laser beam may have an energy density of a Gaussian distribution in which the energy density of a central portion thereof is greater than the energy density of a peripheral portion thereof. The homogenizer 14 may homogenize the energy densities of the Gaussian distribution. The laser beam passing through the homogenizer 14 may be incident to a display substrate DS.

Figure 2:
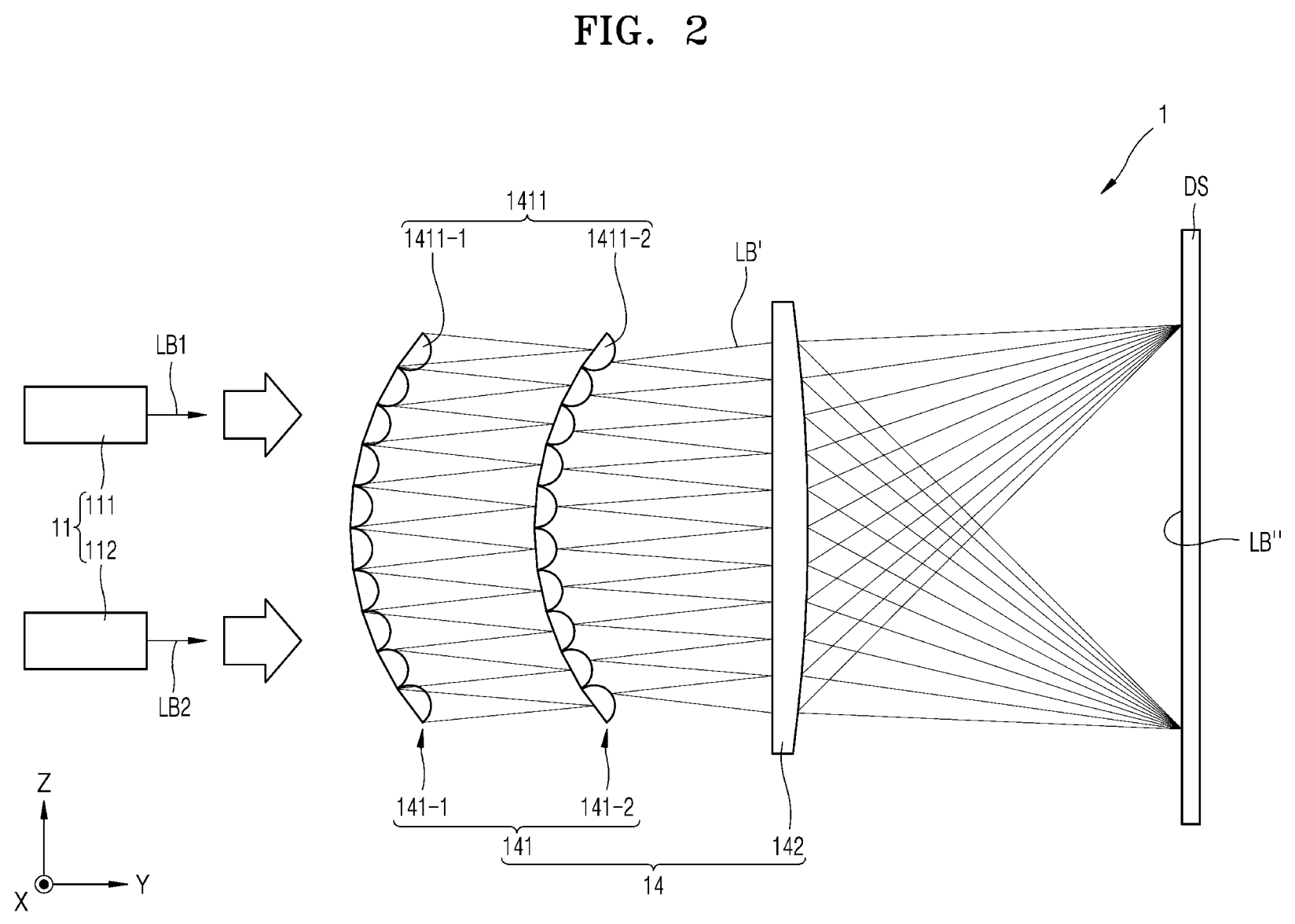

FIG. 2 is a schematic side view of an embodiment of a portion of the apparatus 1 for manufacturing a display device. For convenience of description, the laser conversion unit 12 and the telescopic lens unit 13 described with reference to FIG. 1 are omitted.

Referring to FIG. 2, the homogenizer 14 may include a homogenizing lens unit 141 and a condenser lens unit 142.

The first laser beam LB1 emitted by the first laser unit 111 and the second laser beam LB2 emitted by the second laser unit 112 may be incident to the homogenizing lens unit 141. The first laser beam LB1 and the second laser beam LB2, which are incident to the homogenizing lens unit 141, may be parallel to each other. The homogenizing lens unit 141 may include a plurality of homogenizing lenses 1411. Although FIG. 2 illustrates two laser units, this is only an illustrative embodiment, and the number of laser units is not limited thereto.

The plurality of homogenizing lenses 1411 may separate each of the first laser beam LB1 and the second laser beam LB2 into laser beams toward at least one of a major axis direction and a minor axis direction. In an embodiment, as shown in FIG. 2, each of the plurality of homogenizing lenses 1411 may include a convex lens directed in a traveling direction (e.g., a +Y axis direction) of the first laser beam LB1 and the second laser beam LB2. However, this is only an illustrative embodiment. Unlike shown in FIG. 2, each of the plurality of homogenizing lenses 1411 may include a convex lens directed in a direction (e.g., the −Y axis direction) opposite to the traveling direction of the first laser beam LB1 and the second laser beam LB2.

The homogenizing lens unit 141 may generate overlapping laser beams LB' by overlapping the laser beams obtained by separating the first laser beam LB1 and the laser beams obtained by separating the second laser beam LB2 toward at least one of the major axis direction and the minor axis direction with each other. The plurality of homogenizing lenses 1411 may be arranged such that the laser beams obtained by separating the first laser beam LB1 and the laser beams obtained by separating the second laser beam LB2 overlap with each other. The plurality of homogenizing lenses 1411 may be arranged in a curved shape. In an embodiment, as shown in FIG. 2, the plurality of homogenizing lenses 1411 may be concavely arranged toward the traveling direction (e.g., the +Y axis direction) of the first laser beam LB1 and the second laser beam LB2. However, this is only an illustrative embodiment. Unlike shown in FIG. 2, the plurality of homogenizing lenses 1411 may also be convexly arranged toward the traveling direction (e.g., the +Y axis direction) of the first laser beam LB1 and the second laser beam LB2. An overlapping laser beam LB' passing through the homogenizing lens unit 141 may be incident to the condenser lens unit 142.

A plurality of homogenizing lens units 141 may be provided. The homogenizing lens unit 141 may include a first homogenizing lens unit 141-1 including a plurality of first homogenizing lenses 1411-1 and a second homogenizing lens unit 141-2 including a plurality of second homogenizing lenses 1411-2. The first homogenizing lens unit 141-1 and the second homogenizing lens unit 141-2 may be sequentially arranged in the traveling direction (e.g., the +Y axis direction) of the first laser beam LB1 and the second laser beam LB2. Accordingly, the first laser beam LB1 and the second laser beam LB2 may sequentially pass through the first homogenizing lens unit 141-1 and the second homogenizing lens unit 141-2. FIG. 2 illustrates two homogenizing lens units 141, but this is only an illustrative embodiment, and the number of homogenizing lens units 141 is not limited thereto.

The condenser lens unit 142 may condense the overlapping laser beam LB' into a condensing laser beam LB". The condenser lens unit 142 may adjust the size and focus of the overlapping laser beam LB'. The condensing laser beam LB" may be incident to the display substrate DS.

Figure 3:
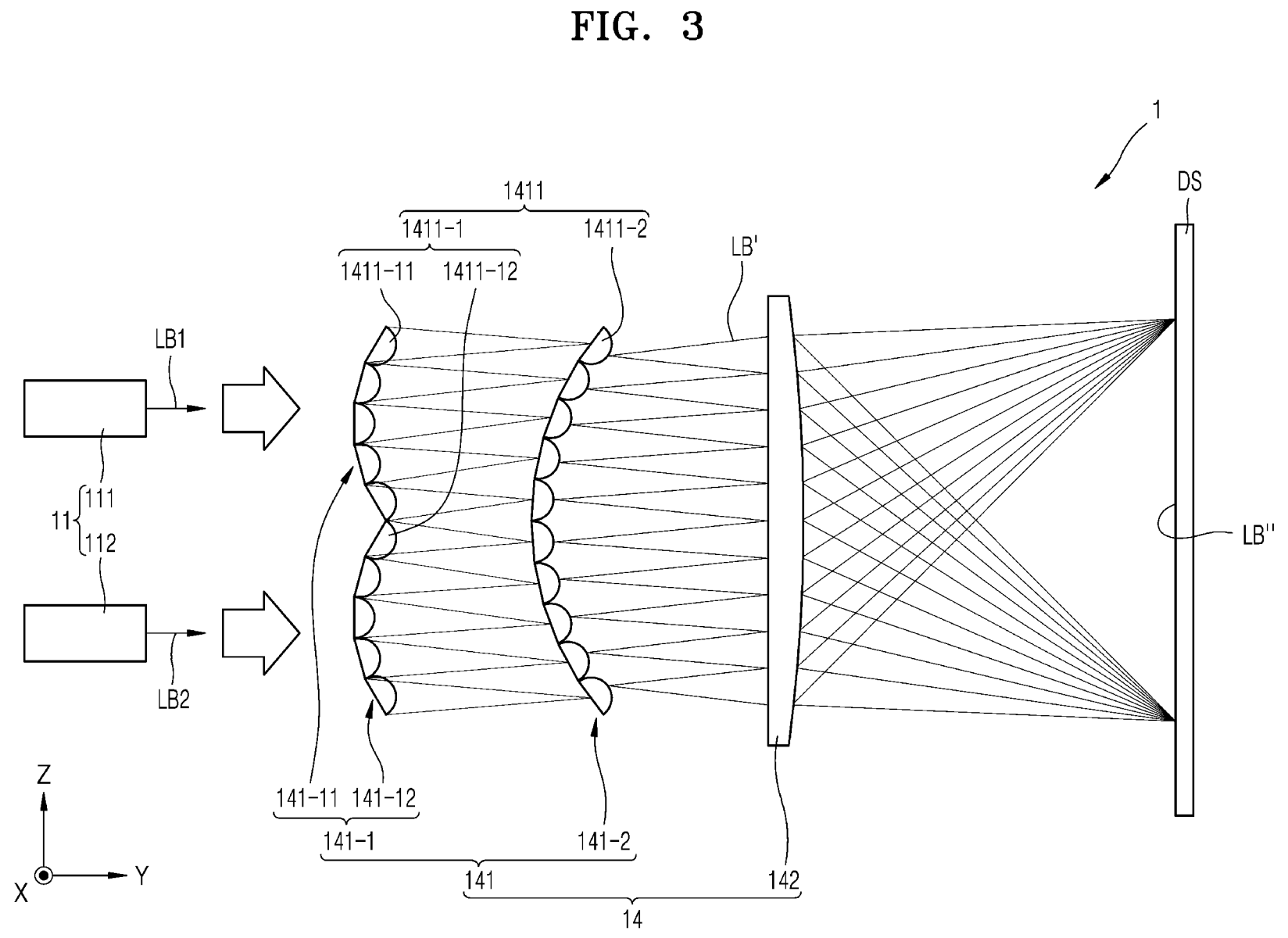

FIG. 3 is a schematic side view of another embodiment of a portion of the apparatus 1 for manufacturing a display device. For convenience of description, the laser conversion unit 12 and the telescopic lens unit 13 described with reference to FIG. 1 are omitted. Also, in FIG. 3, the same reference numerals as those in FIG. 2 refer to the same members, and redundant descriptions thereof are omitted.

Referring to FIG. 3, the first homogenizing lens unit 141-1 may include a first-1 homogenizing lens unit 141-11 and a first-2 homogenizing lens unit 141-12.

The first-1 homogenizing lens unit 141-11 may include a plurality of first-1 homogenizing lenses 1411-11, and the first laser beam LB1 emitted by the first laser unit 111 may be incident to the plurality of first-1 homogenizing lenses 1411-11. The plurality of first-1 homogenizing lenses 1411-11 may separate the first laser beam LB1 into a plurality of laser beams. The first-2 homogenizing lens unit 141-12 may include a plurality of first-2 homogenizing lenses 1411-12, and the second laser beam LB2 emitted by the second laser unit 112 may be incident to the plurality of first-2 homogenizing lenses 1411-12. The plurality of first-2 homogenizing lenses 1411-12 may separate the second laser beam LB2 into a plurality of laser beams.

The first-1 homogenizing lens unit 141-11 and the first-2 homogenizing lens unit 141-12 may be arranged side by side with each other in a direction (e.g., a Z axis direction) perpendicular to the traveling direction of the first laser beam LB1 and the second laser beam LB2. That is, the passage of the first laser beam LB1 through the first-1 homogenizing lens unit 141-11 and the passage of the second laser beam LB2 through the first-2 homogenizing lens unit 141-12 may simultaneously occur. While the first laser beam LB1 passes through the first-1 homogenizing lens unit 141-11 and the second laser beam LB2 passes through the first-2 homogenizing lens unit 141-12, the first laser beam LB1 and the second laser beam LB2 may overlap with each other.

Figure 4:
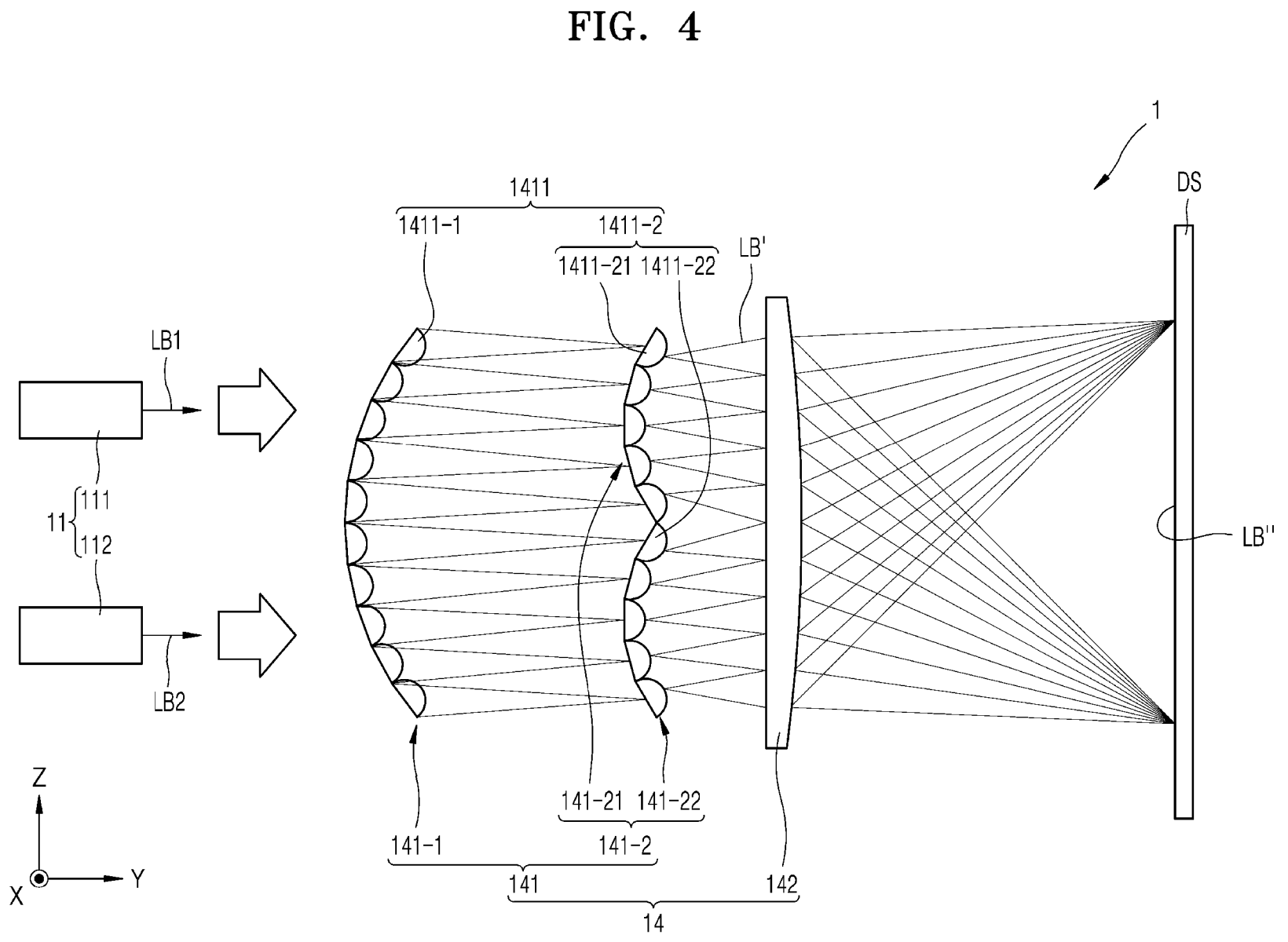

FIG. 4 is a schematic side view of another embodiment of a portion of the apparatus 1 for manufacturing a display device. For convenience of description, the laser conversion unit 12 and the telescopic lens unit 13 described with reference to FIG. 1 are omitted. Also, in FIG. 4, the same reference numerals as those in FIG. 2 refer to the same members, and redundant descriptions thereof are omitted.

Referring to FIG. 4, the second homogenizing lens unit 141-2 may include a second-1 homogenizing lens unit 141-21 and a second-2 homogenizing lens unit 141-22.

The second-1 homogenizing lens unit 141-21 may include a plurality of second-1 homogenizing lenses 1411-21, and the first laser beam LB1 and the second laser beam LB2, which pass through the first homogenizing lens unit 141-1, may be incident to the plurality of second-1 homogenizing lenses 1411-21. The plurality of second-1 homogenizing lenses 1411-21 may separate at least a portion of the first laser beam LB1 and the second laser beam LB2 into a plurality of laser beams. The second-2 homogenizing lens unit 141-22 may include a plurality of second-2 homogenizing lenses 1411-22, and the first laser beam LB1 and the second laser beam LB2, which pass through first homogenizing lens unit 141-1, may be incident to the plurality of second-2 homogenizing lenses 1411-22. The plurality of second-2 homogenizing lenses 1411-22 may separate at least a portion of the first laser beam LB1 and the second laser beam LB2 into the plurality of laser beams.

The second-1 homogenizing lens unit 141-21 and the second-2 homogenizing lens unit 141-22 may be arranged side by side with each other in the direction (e.g., the Z axis direction) perpendicular to the traveling direction of the first laser beam LB1 and the second laser beam LB2. That is, the passage of at least a portion of the first laser beam LB1 and the second laser beam LB2 through the first-1 homogenizing lens unit 141-11 and the passage of at least a portion of the first laser beam LB1 and the second laser beam LB2 through the first-2 homogenizing lens unit 141-12 may simultaneously occur.

Figure 5:
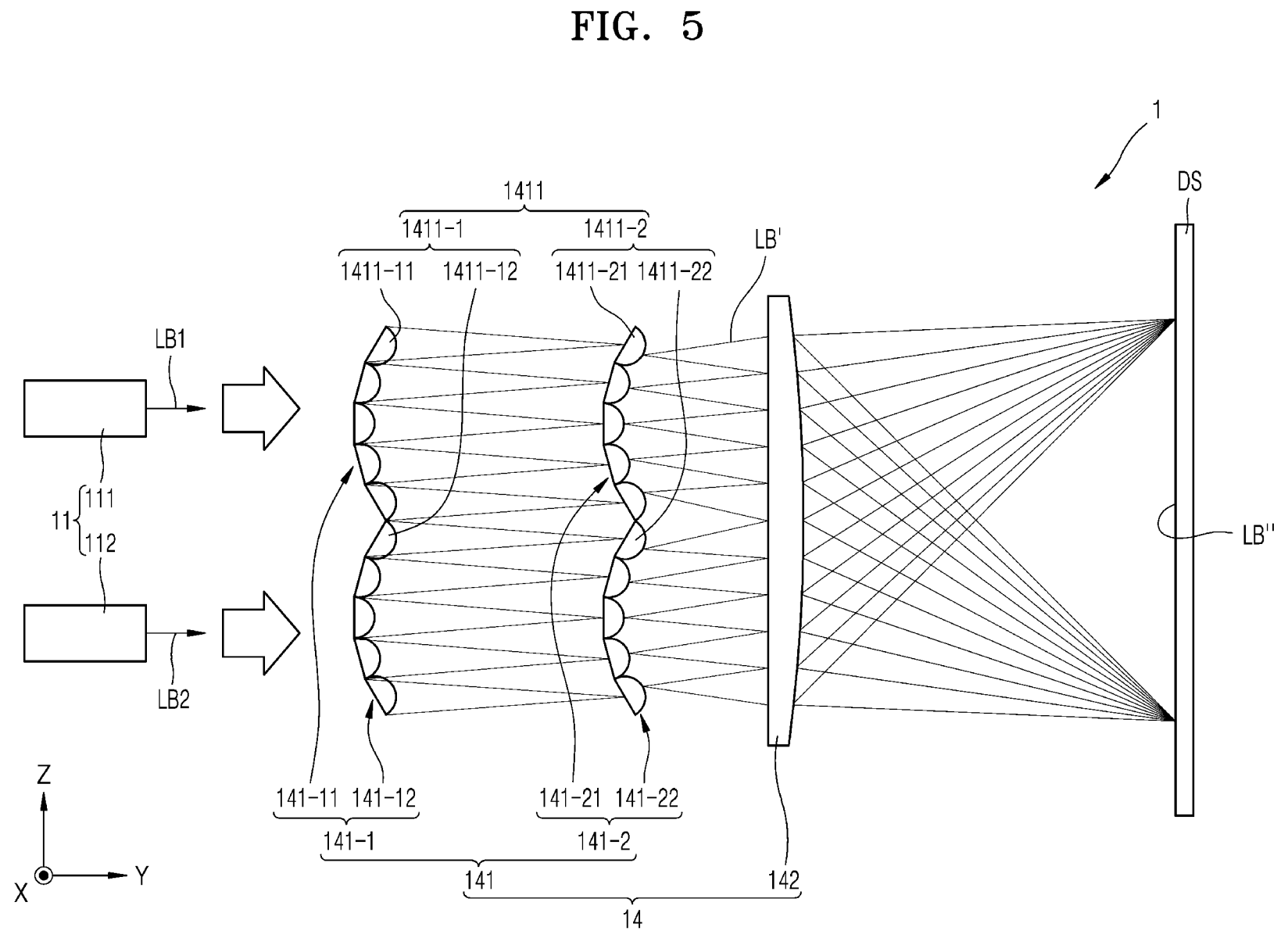

FIG. 5 is a schematic side view of another embodiment of a portion of the apparatus 1 for manufacturing a display device. For convenience of description, the laser conversion unit 12 and the telescopic lens unit 13 described with reference to FIG. 1 are omitted. Also, in FIG. 5, the same reference numerals as those in FIGS. 2 to 4 refer to the same members, and redundant descriptions thereof are omitted.

Referring to FIG. 5, the first homogenizing lens unit 141-1 may include the first-1 homogenizing lens unit 141-11 and the first-2 homogenizing lens unit 141-12. Also, the second homogenizing lens unit 141-2 may include the second-1 homogenizing lens unit 141-21 and the second-2 homogenizing lens unit 141-22.

Figure 6:
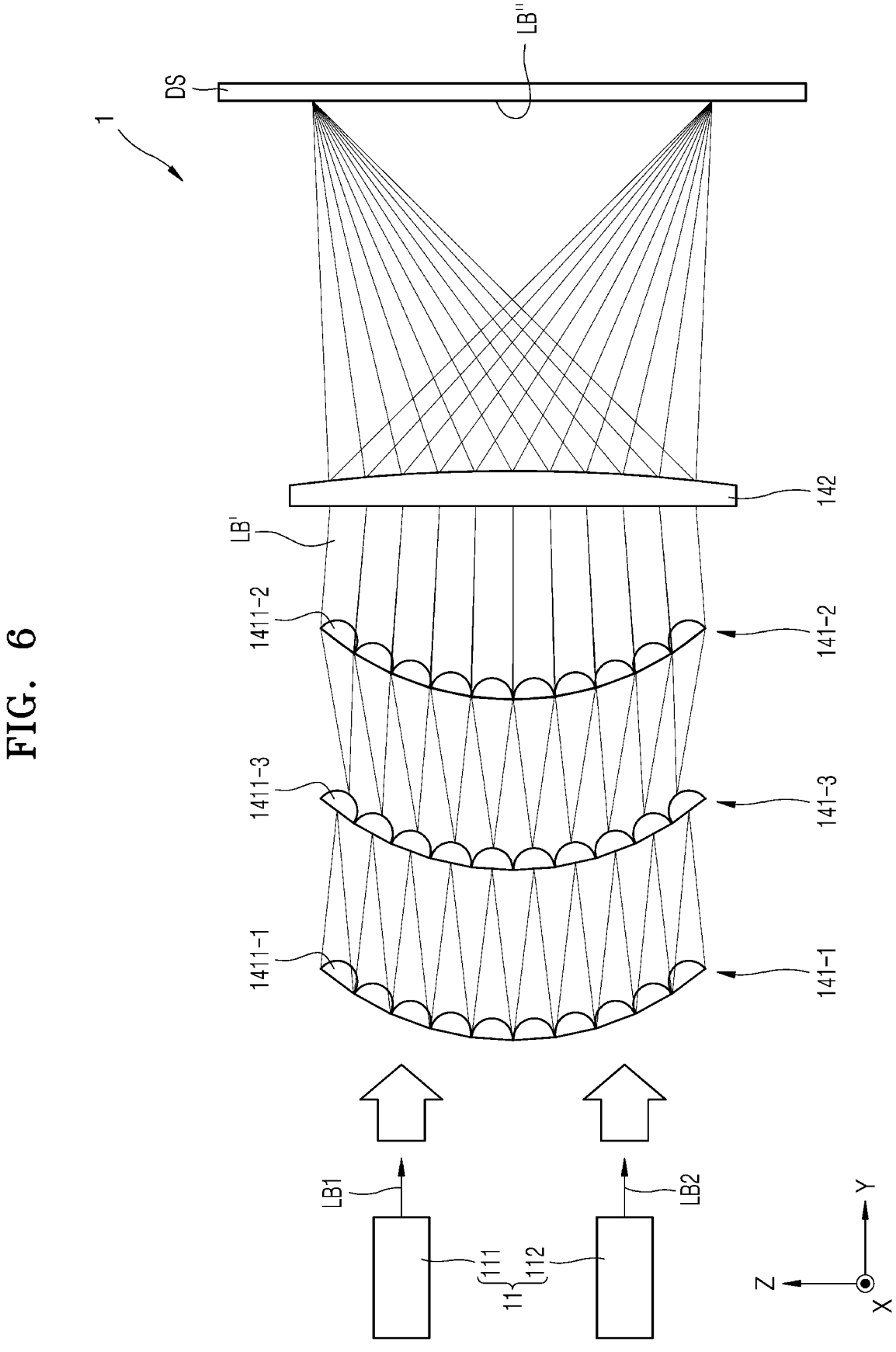
FIG. 6 is a schematic side view of another embodiment of a portion of an apparatus for manufacturing a display device.

FIG. 6 is a schematic side view of another embodiment of a portion of the apparatus 1 for manufacturing a display device. For convenience of description, the laser conversion unit 12 and the telescopic lens unit 13 described with reference to FIG. 1 are omitted. Also, in FIG. 6, the same reference numerals as those in FIG. 2 refer to the same members, and redundant descriptions thereof are omitted.

Referring to FIG. 6, the homogenizing lens unit 141 may include the first homogenizing lens unit 141-1, the second homogenizing lens unit 141-2, and a third homogenizing lens unit 141-3.

The third homogenizing lens unit 141-3 may include a plurality of third homogenizing lenses 1411-3, and the plurality of third homogenizing lenses 1411-3 may separate at least a portion of the first laser beam LB1 and the second laser beam LB2 into a plurality of laser beams. The third homogenizing lens unit 141-3 may be between the first homogenizing lens unit 141-1 and the second homogenizing lens unit 141-2 The third homogenizing lens unit 141-3 may linearly move between the first homogenizing lens unit 141-1 and the second homogenizing lens unit 141-2 in the traveling direction (e.g., the +Y axis direction) of the first laser beam LB1 and the second laser beam LB2 or a direction (e.g., a −Y axis direction) opposite to the traveling direction of the first laser beam LB1 and the second laser beam LB2. Accordingly, the position of the third homogenizing lens unit 141-3 may be adjusted according to the desired distribution and dispersion of the energy density of the condensing laser beam LB".

FIGS. 7 to 13 are schematic side views of embodiments of homogenizing lens units. Also, in FIGS. 7 to 13, the same reference numerals as those in FIG. 2 refer to the same members, and redundant descriptions thereof are omitted.

Referring to FIGS. 7 to 13, the homogenizing lens unit 141 may include the plurality of homogenizing lenses 1411 and an auxiliary lens 1412 connected to the plurality of homogenizing lenses 1411. The auxiliary lens 1412 may include at least one of a convex lens and a concave lens. Accordingly, the homogenizing lens unit 141 may perform an auxiliary function in addition to a function of separating each of the first laser beam LB1 (refer to FIG. 2) and the second laser beam LB2 (refer to FIG. 2) into a plurality of laser beams and overlapping the plurality of laser beams. In an embodiment, the auxiliary lens 1412 may perform at least some of the functions performed by the laser conversion unit 12 and the telescopic lens unit 13 instead, for example. In addition, the auxiliary lens 1412 may perform various functions, such as chromatic aberration correction.

Figure 7:
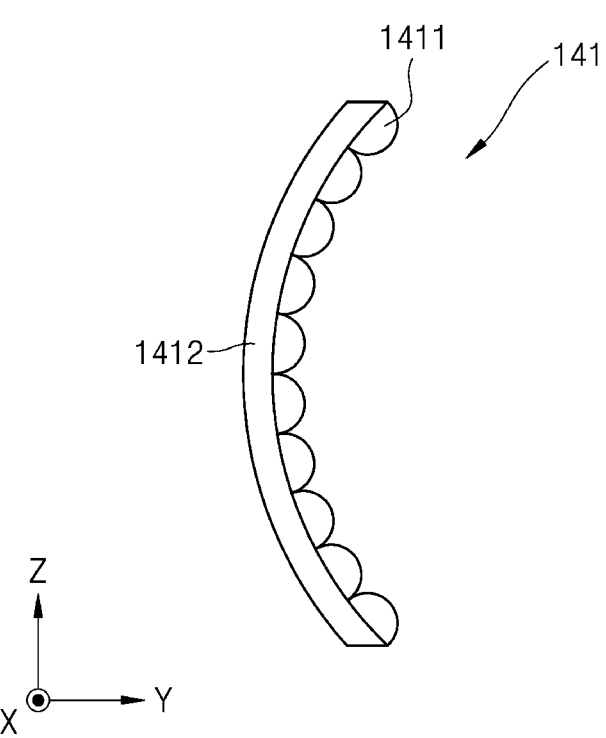
FIGS. 7 to 13 are schematic side views of embodiments of homogenizing lens units.

Referring to FIG. 7, the auxiliary lens 1412 may be a lens that is convex toward the direction (e.g., the −Y axis direction) opposite to the traveling direction of the first laser beam LB1 (refer to FIG. 2) and the second laser beam LB2 (refer to FIG. 2). Also, the auxiliary lens 1412 may be a lens that is concave toward the traveling direction (e.g., the +Y axis direction) of the first laser beam LB1 and the second laser beam LB2. The auxiliary lens 1412 may be an aspherical lens. The plurality of homogenizing lenses 1411 may be arranged on a surface of the auxiliary lens 1412. The surface faces the traveling direction (e.g., the +Y axis direction) of the first laser beam LB1 and the second laser beam LB2. The plurality of homogenizing lenses 1411 may each be a lens that is convex toward the traveling direction (e.g., the +Y axis direction) of the first laser beam LB1 and the second laser beam LB2.

Figure 8:
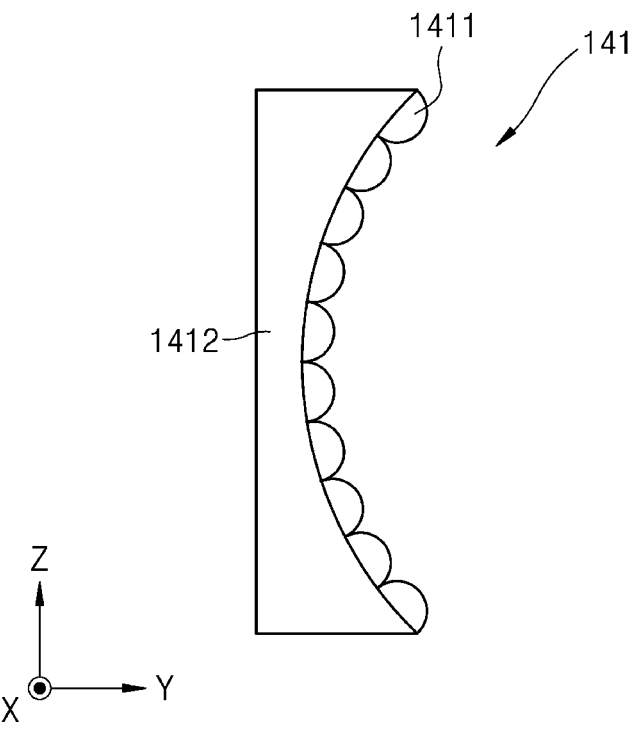
Figure 9:
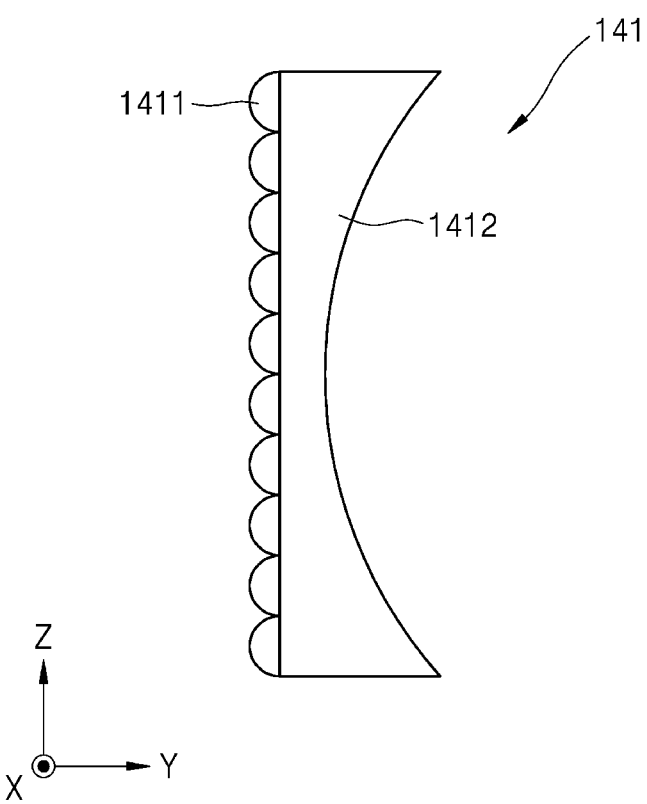

Referring to FIGS. 8 and 9, the auxiliary lens 1412 may be a lens of which a surface toward the direction (e.g., the −Y axis direction) opposite to the traveling direction of the first laser beam LB1 (refer to FIG. 2) and the second laser beam LB2 (refer to FIG. 2) is a flat surface. The auxiliary lens 1412 may be a lens that is concave toward the traveling direction (e.g., the +Y axis direction) of the first laser beam LB1 and the second laser beam LB2.

In an embodiment, as shown in FIG. 8, the plurality of homogenizing lenses 1411 may be arranged on a surface of the auxiliary lens 1412, the surface facing the traveling direction (e.g., the +Y axis direction) of the first laser beam LB1 and the second laser beam LB2, for example. The plurality of homogenizing lenses 1411 may each be a lens that is convex toward the traveling direction (e.g., the +Y axis direction) of the first laser beam LB1 and the second laser beam LB2.

In an embodiment, as shown in FIG. 9, the plurality of homogenizing lenses 1411 may be arranged on a surface of the auxiliary lens 1412, the surface facing the direction (e.g., the −Y axis direction) opposite to the traveling direction of the first laser beam LB1 and the second laser beam LB2, for example. The plurality of homogenizing lenses 1411 may each be a lens that is convex toward the direction (e.g., the −Y axis direction) opposite to the traveling direction of the first laser beam LB1 and the second laser beam LB2.

Figure 10:
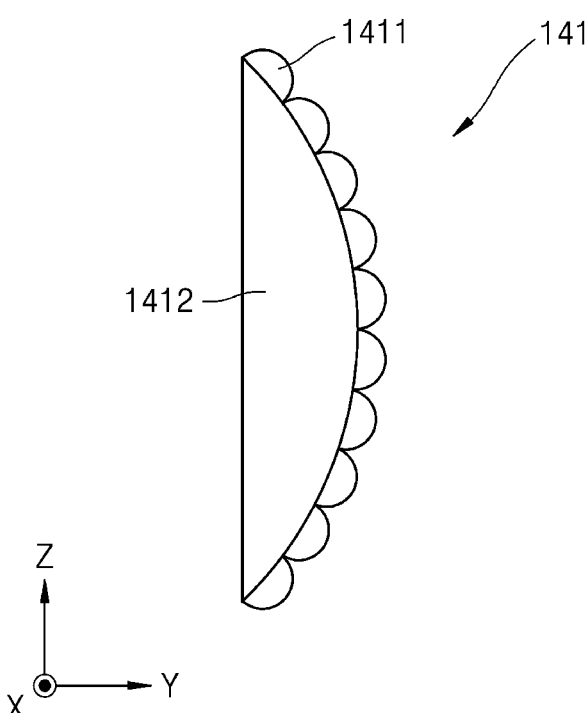
Figure 11:
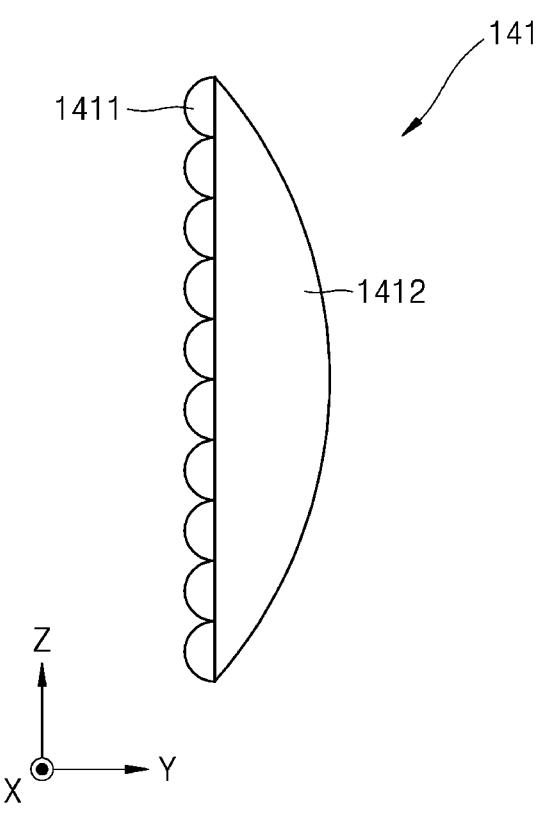

Referring to FIGS. 10 and 11, the auxiliary lens 1412 may be a lens of which a surface toward the direction (e.g., the −Y axis direction) opposite to the traveling direction of the first laser beam LB1 (refer to FIG. 2) and the second laser beam LB2 (refer to FIG. 2) is a flat surface. The auxiliary lens 1412 may be a lens that is convex toward the traveling direction (e.g., the +Y axis direction) of the first laser beam LB1 and the second laser beam LB2.

In an embodiment, as shown in FIG. 10, the plurality of homogenizing lenses 1411 may be arranged on a surface of the auxiliary lens 1412, the surface facing the traveling direction (e.g., the +Y axis direction) of the first laser beam LB1 and the second laser beam LB2. The plurality of homogenizing lenses 1411 may each be a lens that is convex toward the traveling direction (e.g., the +Y axis direction) of the first laser beam LB1 and the second laser beam LB2.

In an embodiment, as shown in FIG. 11, the plurality of homogenizing lenses 1411 may be arranged on a surface of the auxiliary lens 1412, the surface facing the direction (e.g., the −Y axis direction) opposite to the traveling direction of the first laser beam LB1 and the second laser beam LB2, for example. The plurality of homogenizing lenses 1411 may each be a lens that is convex toward the direction (e.g., the −Y axis direction) opposite to the traveling direction of the first laser beam LB1 and the second laser beam LB2.

Figure 12:
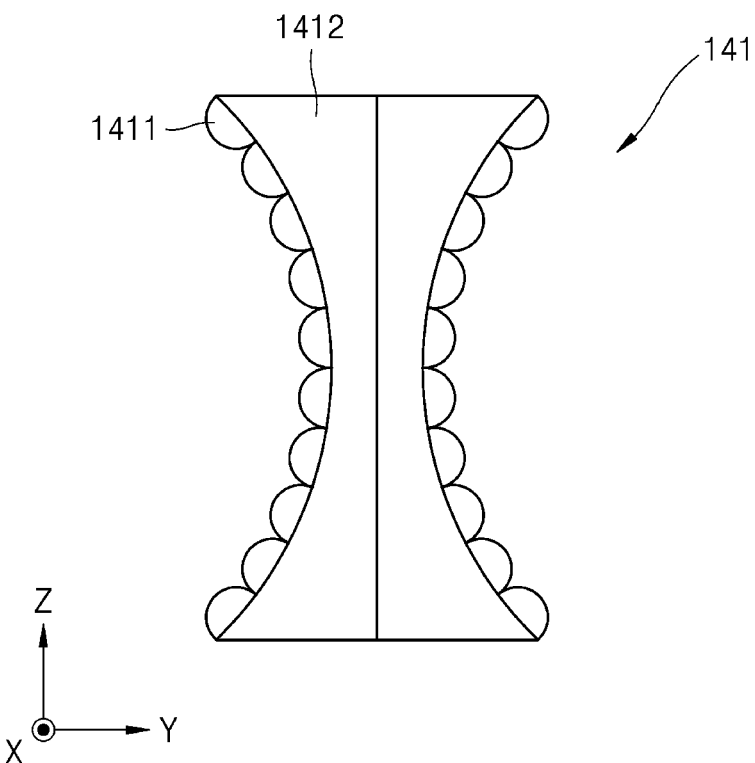

Referring to FIG. 12, the auxiliary lens 1412 may be a lens that is concave toward the direction (e.g., the −Y axis direction) opposite to the traveling direction of the first laser beam LB1 (refer to FIG. 2) and the second laser beam LB2 (refer to FIG. 2). The auxiliary lens 1412 may be a lens that is concave toward the traveling direction (e.g., the +Y axis direction) of the first laser beam LB1 and the second laser beam LB2. That is, the auxiliary lens 1412 in FIG. 12 may be a lens in which two auxiliary lenses 1412 described with reference to FIG. 8 are combined.

In an embodiment, at least some of the plurality of homogenizing lenses 1411 may be arranged on a surface of the auxiliary lens 1412, the surface facing the traveling direction (e.g., the +Y axis direction) of the first laser beam LB1 and the second laser beam LB2, for example. At least some of the plurality of homogenizing lenses 1411 may each be a lens that is convex toward the traveling direction (e.g., the +Y axis direction) of the first laser beam LB1 and the second laser beam LB2.

In an embodiment, at least some of the plurality of homogenizing lenses 1411 may be arranged on a surface of the auxiliary lens 1412, the surface facing the direction (e.g., the −Y axis direction) opposite to the traveling direction of the first laser beam LB1 and the second laser beam LB2, for example. At least some of the plurality of homogenizing lenses 1411 may each be a lens that is convex toward the direction (e.g., the −Y axis direction) opposite to the traveling direction of the first laser beam LB1 and the second laser beam LB2.

Figure 13:
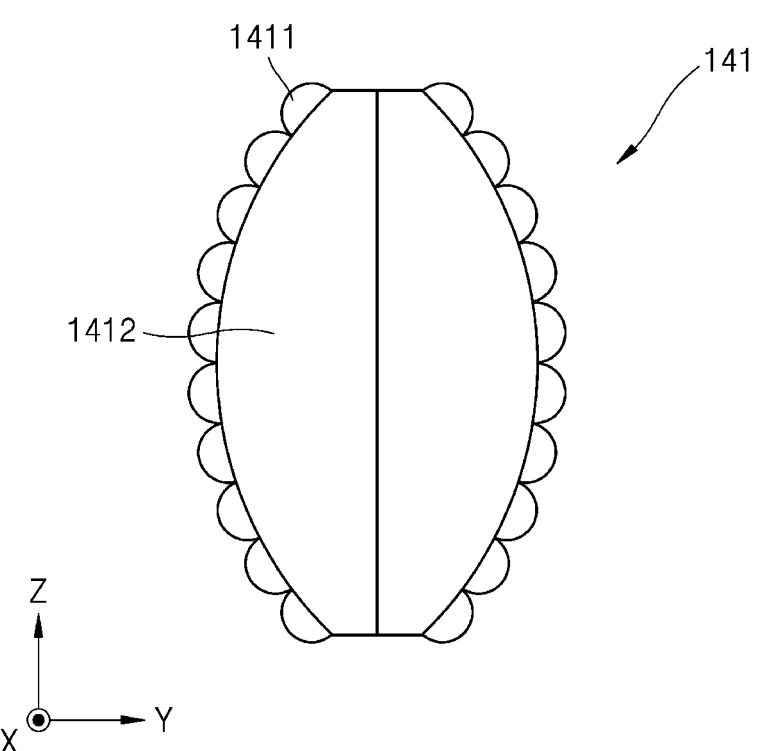

Referring to FIG. 13, the auxiliary lens 1412 may be a lens that is convex toward the direction (e.g., the −Y axis direction) opposite to the traveling direction of the first laser beam LB1 and the second laser beam LB2. The auxiliary lens 1412 may be a lens that is convex toward the traveling direction (e.g., the +Y axis direction) of the first laser beam LB1 and the second laser beam LB2. That is, the auxiliary lens 1412 in FIG. 13 may be a lens in which two auxiliary lenses 1412 described with reference to FIG. 10 are combined.

At least some of the plurality of homogenizing lenses 1411 may be arranged on a surface of the auxiliary lens 1412, the surface facing the traveling direction (e.g., the +Y axis direction) of the first laser beam LB1 and the second laser beam LB2. At least some of the plurality of homogenizing lenses 1411 may each be a lens that is convex toward the traveling direction (e.g., the +Y axis direction) of the first laser beam LB1 and the second laser beam LB2.

At least some of the plurality of homogenizing lenses 1411 may be arranged on a surface of the auxiliary lens 1412, the surface facing the direction (e.g., the −Y axis direction) opposite to the traveling direction of the first laser beam LB1 and the second laser beam LB2. At least some of the plurality of homogenizing lenses 1411 may each be a lens that is convex toward the direction (e.g., the −Y axis direction) opposite to the traveling direction of the first laser beam LB1 and the second laser beam LB2.

FIGS. 7 to 13 are only illustrative embodiments, and the shape and arrangement of the homogenizing lens unit 141 are not limited thereto. The shape and arrangement of the homogenizing lens unit 141 may vary depending on the desired optical characteristics of a laser beam.

Figure 14:
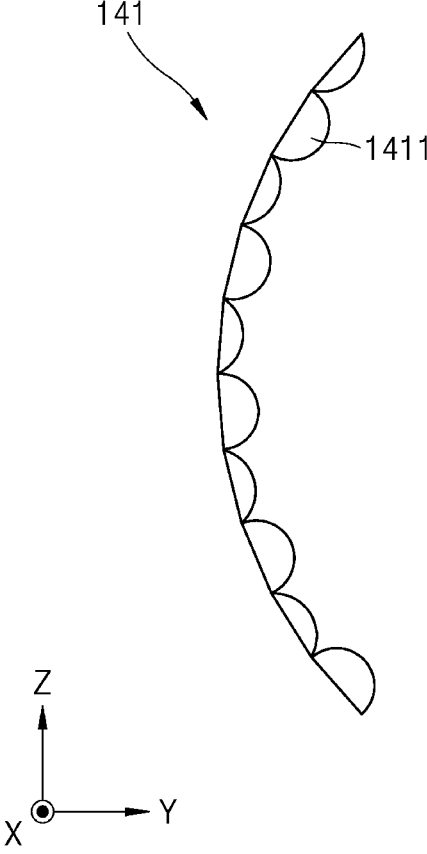
FIG. 14 is a schematic side view of another embodiment of a homogenizing lens unit.

FIG. 14 is a schematic side view of another embodiment of a homogenizing lens unit. In FIG. 14, the same reference numerals as those in FIG. 2 refer to the same members, and redundant descriptions thereof are omitted.

Referring to FIG. 14, at least two of the plurality of homogenizing lenses 1411 may have different shapes. In an embodiment, the plurality of homogenizing lenses 1411 may have different curvatures, for example. A difference in curvature of the plurality of homogenizing lenses 1411 each other may be within about 30%. Due to the difference in shape of the plurality of homogenizing lenses 1411, the uniformity of the energy density of the condensing laser beam LB" may be improved.

Figure 15:
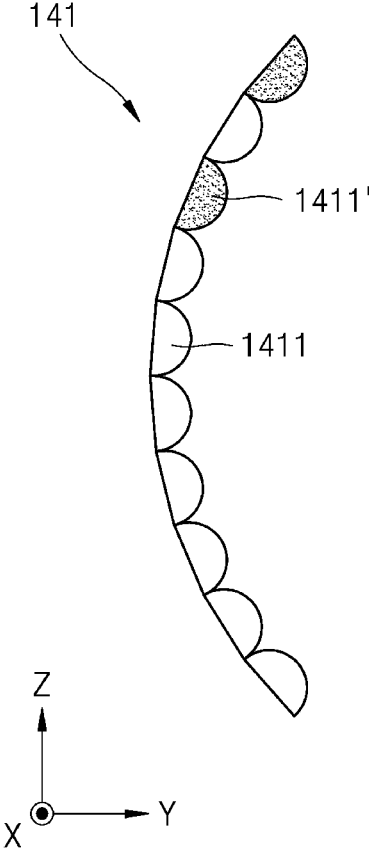
FIG. 15 is a schematic side view of another embodiment of a homogenizing lens unit.

FIG. 15 is a schematic side view of another embodiment of a homogenizing lens unit.

In FIG. 15, the same reference numerals as those in FIG. 2 refer to the same members, and redundant descriptions thereof are omitted.

Referring to FIG. 15, a refractive index of at least one homogenizing lens 1411' of the plurality of homogenizing lenses 1411 may gradually change. One or more homogenizing lenses 1411' of which refractive indices gradually change may include characteristics of any one of a radial shape, a linear shape, a quadrangular shape, e.g., rectangular shape, and a path-shape. The uniformity of the energy density of the condensing laser beam LB" may be improved due to the arrangement of the homogenizing lens 1411' of which the refractive index gradually changes. Although FIG. 15 shows two homogenizing lenses 1411' of which refractive indices gradually change, this is only an illustrative embodiment, and the number of homogenizing lenses 1411' of which refractive indices gradually change is not limited thereto.

Figure 16:
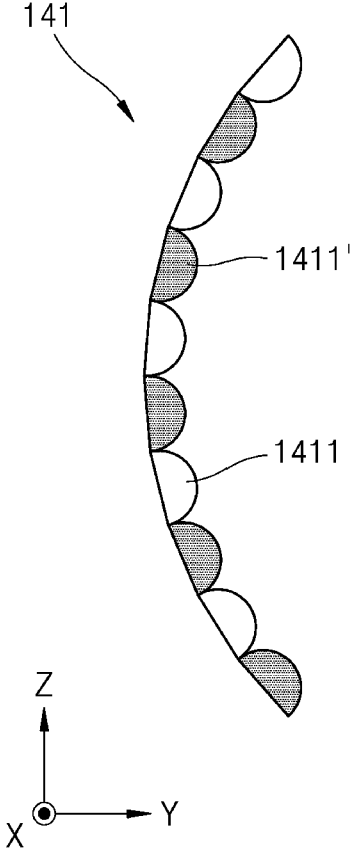
FIG. 16 is a schematic side view of another embodiment of a homogenizing lens unit.

FIG. 16 is a schematic side view of another embodiment of a homogenizing lens unit.

In FIG. 16, the same reference numerals as those in FIG. 2 refer to the same members, and redundant descriptions thereof are omitted.

At least one homogenizing lens 1411" of the plurality of homogenizing lenses 1411 may have polarization characteristics. In an embodiment, one or more homogenizing lenses 1411" having polarization characteristics may include any one of a polarizer and a polarization rotator, or may have a polarization coating arranged on a surface thereof, for example. Accordingly, the first laser beam LB1 and the second laser beam LB2, which pass through the homogenizing lens unit 141, may have polarization characteristics while being separated into a plurality of laser beams and overlapped. Although FIG. 16 shows five homogenizing lenses 1411" having polarization characteristics, this is only an illustrative embodiment, and the number of homogenizing lenses 1411" having polarization characteristics is not limited thereto.

Figure 17:
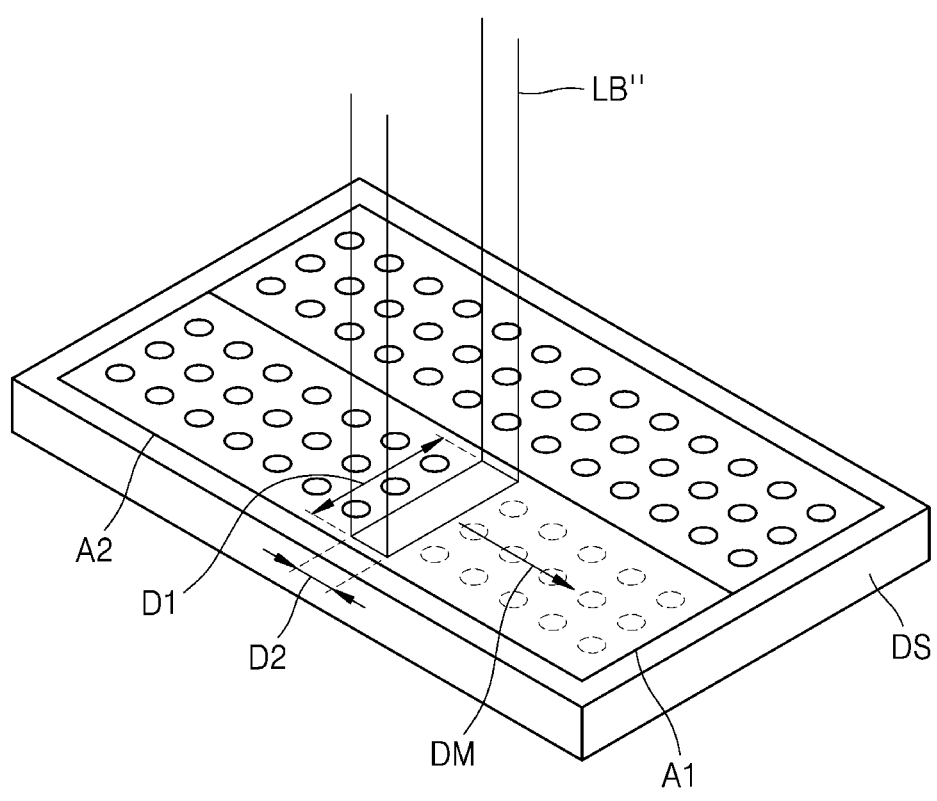
FIG. 17 is a schematic perspective view for explaining an embodiment of a process of irradiating a laser to a display substrate.

FIG. 17 is a schematic perspective view for explaining an embodiment of a process of irradiating a laser to a display substrate.

Referring to FIG. 17, the apparatus 1 for manufacturing a display device (refer to FIG. 1) may irradiate an overlapping laser beam LB" to the display substrate DS.

The overlapping laser beam LB" may be irradiated onto a first area A1 of the display substrate DS. As the overlapping laser beam LB" is irradiated onto the first area A1, the first area A1 may be crystallized and converted into a second area A2. The overlapping laser beam LB" irradiated onto the display substrate DS may move in a moving direction DM. The moving direction DM may be perpendicular to a major axis direction D1 of the overlapping laser beam LB" and parallel to a minor axis direction of the overlapping laser beam LB". As the overlapping laser beam LB" moves in the moving direction DM, the second area A2 may be gradually converted into the first area A1.

Figure 18:
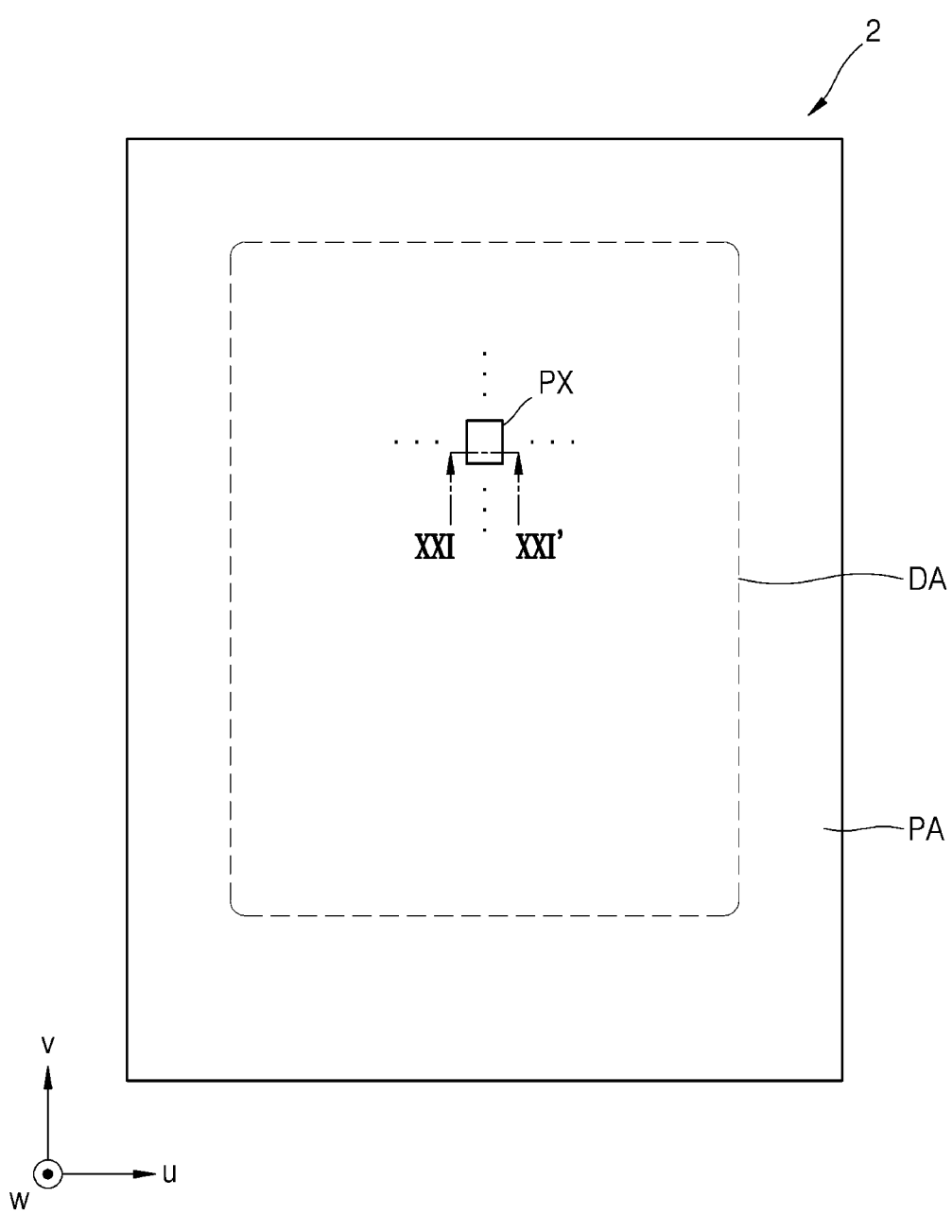
FIG. 18 is a schematic plan view of an embodiment of a display device.

FIG. 18 is a schematic plan view of an embodiment of a display device 2.

Referring to FIG. 18, the display device 2 manufactured in an embodiment may include a display area DA and a peripheral area PA outside the display area DA. The display device 2 may provide an image through an array of a plurality of pixels PX, which are two-dimensionally arranged in the display area DA.

The peripheral area PA is an area which does not provide an image, and may entirely or partially surround the display area DA. A driver which provides electrical signals or power to a pixel circuit corresponding to each of the plurality of pixels PX or the like may be arranged in the peripheral area PA. A pad, which is an area to which an electronic device or a printed circuit board may be electrically connected, may be arranged in the peripheral area PA.

Hereinafter, although the display device 2 is described as including an organic light-emitting diode as a light-emitting element, the display device 2 is not limited thereto. In another embodiment, the display device 2 may be a light-emitting display device including an inorganic light-emitting diode, that is, an inorganic light-emitting display device. The inorganic light-emitting diode may include a PN junction diode including materials based on inorganic semiconductors. When a voltage is applied to the PN junction diode in a forward direction, holes and electrons may be injected, and energy generated by recombination of the holes and electrons may be converted into light energy to emit a predetermined color of light. The inorganic light-emitting diode described above may have a width of several micrometers to several hundreds of micrometers, and in some embodiments, the inorganic light-emitting diode may be also referred to as a micro light-emitting diode ("LED"). In another embodiment, the display device 2 may be a quantum dot light-emitting display device.

The display device 2 may be a portable electronic device, such as a mobile phone, a smartphone, a table personal computer, a mobile communication terminal, an electronic notebook, an electronic book, a portable multimedia player ("PMP"), a navigation device, an Ultra Mobile PC ("UMPC"), or the like, and may also be used as a display screen of various products, such as a television, a laptop computer, a monitor, an advertisement board, an Internet of things ("IoT") device, or the like. In addition, the display device 2 in an embodiment may be used as a wearable device, such as a smart watch, a watch phone, a glasses-type display, and a head-mounted display ("HMD"). In addition, the display device 2 in an embodiment may be used as a dashboard of a vehicle, a center fascia of a vehicle or a center information display ("CID") disposed on a dashboard, a rear-view mirror display replacing a side mirror of a vehicle, and a display screen disposed on a back surface of a front seat as entertainment for a passenger in a back seat of a vehicle.

Figure 19:
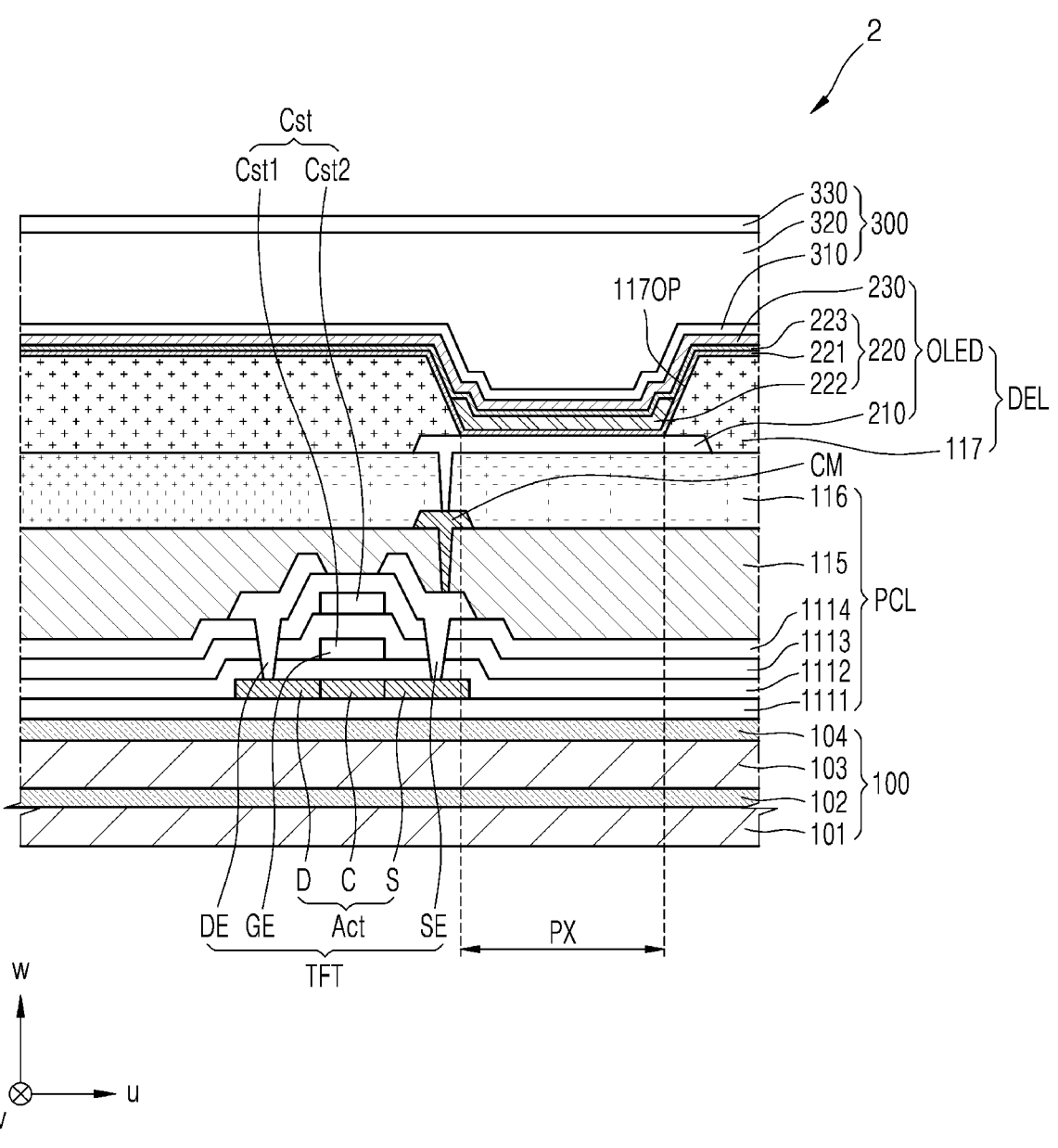
FIG. 19 is a schematic cross-sectional view of an embodiment of a display device manufactured by a method of manufacturing a display device.

FIG. 19 is a schematic cross-sectional view of an embodiment of a display device manufactured by a method of manufacturing a display device, taken along line XXI-XXI' of FIG. 18.

Referring to FIG. 19, the display device 2 may include a stacked structure of a substrate 100, a pixel circuit layer PCL, a display element layer DEL, and an encapsulation layer 300. The display substrate DS (refer to FIG. 17) described above may be obtained in a process of stacking at least one of the pixel circuit layer PCL, the display element layer DEL, and the encapsulation layer 300 on the substrate 100 in a process of manufacturing the display device 2, for example.

The substrate 100 may have a multi-layered structure including a base layer and an inorganic layer, the base layer including a polymer resin. In an embodiment, the substrate 100 may include a base layer including a polymer resin, and a barrier layer of an inorganic insulating layer, for example. In an embodiment, the substrate 100 may include a first base layer 101, a first barrier layer 102, a second base layer 103, and a second barrier layer 104, which are sequentially stacked, for example. The first base layer 101 and the second base layer 103 may each include polyimide ("PI"), polyethersulfone ("PES"), polyarylate, polyetherimide ("PEI"), polyethylene naphthalate ("PEN"), polyethylene terephthalate ("PET"), polyphenylene sulfide ("PPS"), polycarbonate, cellulose triacetate ("TAC"), or/and cellulose acetate propionate ("CAP"), or the like. The first barrier layer 102 and the second barrier layer 104 may each include an inorganic insulating material, such as silicon oxide, silicon nitride, and/or silicon oxynitride. The substrate 100 may be flexible.

The pixel circuit layer PCL may be disposed on the substrate 100. FIG. 19 illustrates that the pixel circuit layer PCL includes a thin-film transistor TFT, a buffer layer 1111, a first gate insulating layer 1112, a second gate insulating layer 1113, an inter-insulating layer 1114, a first planarization insulating layer 115, and a second planarization insulating layer 116, which are disposed below or/and above the components of the thin-film transistor TFT.

The buffer layer 1111 may reduce or block penetration of foreign materials, moisture, or external air from a lower portion of the substrate 100 and may provide a flat surface on the substrate 100. The buffer layer 1111 may include an inorganic insulating material, such as silicon oxide, silicon oxynitride, and silicon nitride, and may include a single layered structure or a multi-layered structure, each including the above-stated material.

The thin-film transistor TFT disposed on the buffer layer 1111 may include a semiconductor layer Act, and the semiconductor layer Act may include polysilicon (poly-Si). In an alternative embodiment, the semiconductor layer Act may include amorphous silicon (a-Si), an oxide semiconductor, an organic semiconductor, or the like. The semiconductor layer Act may include a channel area C, a drain area D, and a source area S, wherein the drain area D and the source area S are respectively arranged on opposite sides of the channel area C. A gate electrode GE of the thin-film transistor TFT may overlap the channel area C.

The display substrate DS described with reference to FIGS. 1 to 16 may include the substrate 100 and the thin-film transistor TFT in FIG. 19. The overlapping laser beam LB" (refer to FIG. 2) irradiated from the apparatus 1 for manufacturing a display device may be irradiated to the semiconductor layer Act. Accordingly, polysilicon arranged in the semiconductor layer Act may be crystallized into amorphous silicon.

The gate electrode GE may include a low-resistance metal material. The gate electrode GE may include a conductive material including molybdenum (Mo), aluminum (Al), copper (Cu), titanium (Ti), or the like, and may be a multi-layer or a single layer, each including the above-stated material.

The first gate insulating layer 1112 between the semiconductor layer Act and the gate electrode GE may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), or the like. The zinc oxide ($ZnO_x$) may be zinc oxide (ZnO) and/or zinc peroxide ($ZnO_2$).

The second gate insulating layer 1113 may cover the gate electrode GE. Similar to the first gate insulating layer 1112, the second gate insulating layer 1113 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), or the like. The zinc oxide ($ZnO_x$) may be zinc oxide (ZnO) and/or zinc peroxide ($ZnO_2$).

An upper electrode Cst2 of a storage capacitor Cst may be disposed on the second gate insulating layer 1113. The upper electrode Cst2 may overlap the gate electrode GE therebelow. At this time, the gate electrode GE and the upper electrode Cst2, which overlap with each other with the second gate insulating layer 1113 therebetween, may form the storage capacitor Cst. That is, the gate electrode GE may function as a lower electrode Cst1 of the storage capacitor Cst.

As such, the storage capacitor Cst and the thin-film transistor TFT may overlap with each other. In some embodiments, the storage capacitor Cst may not overlap the thin-film transistor TFT.

The upper electrode Cst2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu, and may be a single layer or a multi-layer, each including the material stated above.

The inter-insulating layer 1114 may cover the upper electrode Cst2. The inter-insulating layer 1114 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), or the like. The zinc oxide ($ZnO_x$) may be zinc oxide (ZnO) and/or zinc peroxide ($ZnO_2$). The inter-insulating layer 1114 may include a single layer or a multi-layer, each including the inorganic insulating material stated above.

Each of a drain electrode DE and a source electrode SE may be disposed on the inter-insulating layer 1114. The drain electrode DE and the source electrode SE may respectively be connected to the drain electrode DE and the source electrode SE through contact holes defined in insulating layers below the drain electrode DE and the source electrode SE. The drain electrode DE and the source electrode SE may each include a material having good conductivity. The drain electrode DE and the source electrode SE may include a conductive material including Mo, Al, Cu, Ti, or the like, and may include a multi-layer or a single layer, each including the above material. In an embodiment, the drain electrode DE and the source electrode SE may each have a multi-layered structure of Ti/Al/Ti.

The first planarization insulating layer 115 may cover the drain electrode DE and the source electrode SE. The first planarization insulating layer 115 may include a general commercial polymer, such as poly(methyl methacrylate) ("PMMA") or polystyrene ("PS"), a polymer derivative having a phenol group, and an organic insulating material, such as an acrylic polymer, an imide polymer, an aryl ether polymer, an amide polymer, a fluorine polymer, a p-xylene polymer, a vinyl alcohol polymer, or any combinations thereof.

The second planarization insulating layer 116 may be disposed on the first planarization insulating layer 115. The second planarization insulating layer 116 may include the same material as that of the first planarization insulating layer 115, and may include a general commercial polymer, such as PMMA or PS, a polymer derivative having a phenol group, and an organic insulating material, such as an acrylic polymer, an imide polymer, an aryl ether polymer, an amide polymer, a fluorine polymer, a p-xylene polymer, a vinyl alcohol polymer, or any combinations thereof.

The display element layer DEL may be disposed on the pixel circuit layer PCL having the structure described above. The display element layer DEL may include an organic light-emitting diode OLED as a display element (that is, a light-emitting element), and the organic light-emitting diode OLED may include a stacked structure of a pixel electrode 210, an intermediate layer 220, and a common electrode 230. The organic light-emitting diode OLED may emit, e.g., red, green, or blue light, or may emit red, green, blue, or white light. The organic light-emitting diode OLED may emit light through an emission area, and define the emission area as a pixel PX.

The pixel electrode 210 of the organic light-emitting diode OLED may be electrically connected to the thin-film transistor TFT through contact holes defined in the second planarization insulating layer 116 and the first planarization insulating layer 115 and a contact metal CM disposed on the first planarization insulating layer 115.

The pixel electrode 210 may include a conductive oxide, such as indium tin oxide ("ITO"), indium zinc oxide ("IZO"), zinc oxide (ZnO), indium oxide ($In_2O_3$), indium gallium oxide ("IGO"), or aluminum zinc oxide ("AZO"). In another embodiment, the pixel electrode 210 may include a reflective film including Ag, Mg, Al, Pt, Pd, Au, Ni, Nd, Ir, Cr, or any combinations thereof. In another embodiment, the pixel electrode 210 may further include a film including ITO, IZO, ZnO, or $In_2O_3$ above/below the reflective film described above.

A pixel defining layer 117 in which an opening 1170P exposing a central portion of the pixel electrode 210 is defined is disposed on the pixel electrode 210. The pixel defining layer 117 may include an organic insulating material and/or an inorganic insulating material. The opening 1170P may define an emission area of light emitted from the organic light-emitting diode OLED. In an embodiment, the size/width of the opening 1170P may correspond to the size/width of the emission area. Accordingly, the size and/or width of the pixel PX may depend on the size and/or width of the opening 1170P of the pixel defining layer 117 corresponding to the pixel PX.

The intermediate layer 220 may include an emission layer 222 formed to correspond to the pixel electrode 210. The emission layer 222 may include a polymer organic material or a low-molecular-weight organic material, which emits light of a predetermined color. In an alternative embodiment, the emission layer 222 may include an inorganic light-emitting material or a quantum dot.

In an embodiment, the intermediate layer 220 may include a first functional layer 221 and a second functional layer 223 respectively disposed below and on the emission layer 222. The first functional layer 221 may include a hole transport layer ("HTL"), or an HTL and a hole injection layer ("HIL"). The second functional layer 223 is a component disposed on the emission layer 222, and may include an electron transport layer ("ETL") and/or an electron injection layer ("EIL"). Similar to the common electrode 230 to be described below, the first functional layer 221 and/or the second functional layer 223 may be a common layer entirely covering the substrate 100.

The common electrode 230 may be disposed above the pixel electrode 210 and overlap the pixel electrode 210. The common electrode 230 may include a conductive material having a relatively low work function. In an embodiment, the common electrode 230 may include a (semi)transparent layer including Ag, Mg, Al, Pt, Pd, Au, Ni, Nd, Ir, Cr, lithium (Li), Ca, any alloys thereof, or the like, for example. In an alternative embodiment, the common electrode 230 may further include a layer, such as ITO, IZO, ZnO, or $In_2O_3$, above the (semi)transparent layer including the materials stated above. The common electrode 230 may be unitary to cover an entirety of the substrate 100.

The encapsulation layer 300 may be disposed on the display element layer DEL and cover the display element layer DEL. The encapsulation layer 300 may include at least one inorganic encapsulation layer and at least one organic encapsulation layer. In an embodiment, FIG. 19 illustrates that the encapsulation layer 300 includes a first inorganic encapsulation layer 310, an organic encapsulation layer 320, and a second inorganic encapsulation layer 330, which are sequentially stacked.

The first inorganic encapsulation layer 310 and the second inorganic encapsulation layer 330 may each include at least one inorganic material from among aluminum oxide, titanium oxide, tantalum oxide, hafnium oxide, zinc oxide, silicon oxide, silicon nitride, or silicon oxynitride. The organic encapsulation layer 320 may include a polymer-based material. The polymer-based material may include acrylic resin, epoxy resin, polyimide, polyethylene, or the like. In an embodiment, the organic encapsulation layer 320 may include acrylate. The organic encapsulation layer 320 may be formed by curing a monomer or coating a polymer. The organic encapsulation layer 320 may have transparency.

Although not shown in FIG. 19, a touch sensor layer may be disposed on the encapsulation layer 300, and an optical functional layer may be disposed on the touch sensor layer. The touch sensor layer may obtain coordinate information according to an external input, e.g., a touch event. The optical functional layer may reduce the reflectance of light (external light) incident from the outside toward the display device, and/or improve color purity of light emitted by the display device. In an embodiment, the optical functional layer may include a retarder and/or a polarizer. The retarder may be a film type or a liquid-crystal coating type, and may include a $\lambda/2$ retarder and/or a $\lambda/4$ retarder. The polarizer may also be a film type or a liquid-crystal coating type. The film-type polarizer may include a stretch-type synthetic resin film, and the liquid-crystal-coating-type polarizer may include liquid crystals in a predetermined arrangement. The retarder and the polarizer may further include a protective film.

An adhesive member may be between the touch sensor layer and the optical functional layer. As the adhesive member, a general adhesive member known in the related art may be employed without limitation. The adhesive member may be a pressure sensitive adhesive ("PSA").

Figure 20:
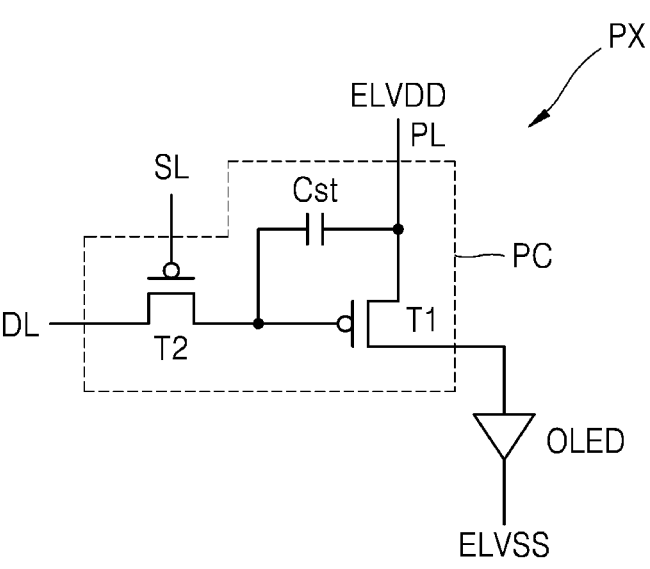
FIG. 20 is an equivalent circuit diagram of an embodiment of a pixel of a display panel.

FIG. 20 is an equivalent circuit diagram of an embodiment of a pixel of a display panel.

Each pixel PX may include a pixel circuit PC and a display element connected to the pixel circuit PC, e.g., an organic light-emitting diode OLED. The pixel circuit PC may include a first thin-film transistor T1, a second thin-film transistor T2, and a storage capacitor Cst. Each pixel PX may emit, e.g., red, green, blue, or white light through the organic light-emitting diode OLED.

The second thin-film transistor T2 is a switching thin-film transistor which may be connected to a scan line SL and a data line DL and may deliver a data voltage, to the first thin-film transistor T1, input from the data line DL based on a switching voltage input from the scan line SL. The storage capacitor Cst may be connected to the second thin-film transistor T2 and a driving voltage line PL and store a voltage corresponding to a difference between a voltage received from the second thin-film transistor T2 and a first power supply voltage ELVDD supplied to the driving voltage line PL.

The first thin-film transistor T1 is a driving thin-film transistor which may be connected to the driving voltage line PL and the storage capacitor Cst and control a driving current flowing from the driving voltage line PL through the organic light-emitting diode OLED in accordance with a voltage value stored in the storage capacitor Cst. The organic light-emitting diode OLED may emit light having a predetermined brightness according to the driving current. An opposite electrode (e.g., a cathode) of the organic light-emitting diode OLED may receive a second power supply voltage ELVSS. In an embodiment, a ground voltage instead of the second power supply voltage ELVSS may be applied.

Although it is described with reference to FIG. 20 that the pixel circuit PC includes two thin-film transistors and one storage capacitor, the disclosure is not limited thereto. The number of thin-film transistors and the number of storage capacitors may be variously changed according to the design of the pixel circuit PC. In an embodiment, the pixel circuit PC may further include four or more thin-film transistors in addition to the above-mentioned two thin-film transistors, for example.

By embodiments, the energy density distribution of laser beams may be made uniform in a process of separating the laser beams into a plurality of laser beams and overlapping the plurality of laser beams.

Effects of the disclosure are not limited to the effects mentioned above, and other effects not mentioned will be clearly understood by one of ordinary skill in the art from the description of the claims.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. An apparatus for manufacturing a display device, the apparatus comprising:
a laser emission unit comprising a first laser unit emitting a first laser beam and a second laser unit emitting a second laser beam; and
a homogenizer which homogenizes the first laser beam and the second laser beam, the homogenizer comprising:
a homogenizing lens unit comprising a plurality of homogenizing lenses which separate each of the first laser beam and the second laser beam into a plurality of laser beams and generate overlapping laser beams by overlapping the plurality of laser beams obtained by separating each of the first laser beam and the second laser beam with each other; and
a condenser lens unit which condenses the overlapping laser beams,
wherein the plurality of homogenizing lenses is arranged in a curved shape.

2. The apparatus of claim 1, wherein the homogenizing lens unit further comprises:
a first homogenizing lens unit comprising a plurality of first homogenizing lenses; and
a second homogenizing lens unit comprising a plurality of second homogenizing lenses,
wherein each of the first laser beam and the second laser beam sequentially passes through the first homogenizing lens unit and the second homogenizing lens unit.

3. The apparatus of claim 2, wherein the first homogenizing lens unit comprises:
a first-1 homogenizing lens unit into which the first laser beam is incident and comprising a plurality of first-1 homogenizing lenses; and
a first-2 homogenizing lens unit into which the second laser beam is incident, comprising a plurality of first-2 homogenizing lenses, and arranged side by side with the first-1 homogenizing lens unit,
wherein the first laser beam and the second laser beam overlap with each other while the first laser beam passes through the first-1 homogenizing lens unit and the second laser beam passes through the first-2 homogenizing lens unit.

4. The apparatus of claim 2, wherein the second homogenizing lens unit comprises:
a second-1 homogenizing lens unit comprising a plurality of second-1 homogenizing lenses; and
a second-2 homogenizing lens unit comprising a plurality of second-2 homogenizing lenses and arranged side by side with the second-1 homogenizing lens unit.

5. The apparatus of claim 2, wherein the homogenizing lens unit further comprises a third homogenizing lens unit comprising a plurality of third homogenizing lenses, and
the third homogenizing lens unit is linearly movable between the first homogenizing lens unit and the second homogenizing lens unit.

6. The apparatus of claim 1, wherein at least two of the plurality of homogenizing lenses has different shapes.

7. The apparatus of claim 1, wherein at least one of the plurality of homogenizing lenses has a refractive index which gradually changes.

8. The apparatus of claim 1, wherein at least one of the plurality of homogenizing lenses has polarization characteristics.

9. The apparatus of claim 1, wherein the homogenizing lens unit further comprises an auxiliary lens connected to the plurality of homogenizing lenses.

10. The apparatus of claim 9, wherein the auxiliary lens comprises at least one of a convex lens and a concave lens.

* * * * *